United States Patent Office 3,257,208
Patented June 21, 1966

3,257,208
PROTEINACEOUS MATERIALS
August Jean Van Paesschen, Hove-Antwerp, Marcel Nicolas Vrancken, Berchem-Antwerp, and René Maurice Hart, Wilrijk-Antwerp, Belgium, assignors to Gevaert Photo-Producten N.V., Mortsel, Belgium, a Belgian company
No Drawing. Filed Mar. 23, 1962, Ser. No. 182,119
Claims priority, application Great Britain, Mar. 24, 1961, 10,957/61
11 Claims. (Cl. 96—114)

The present invention relates to an improved method for hardening proteins or proteinaceous substances, more particularly gelatin, and especially for the hardening of photographic gelatin layers.

It is generally known to harden soluble or fusible macromolecular products after shaping which allows combining the particular properties of the starting materials with a reduced solubility and a higher thermostability.

For instance by using gelatin in photographic emulsion layers, it is important to harden the gelatin in order to render it more resistant to warm aqueous solutions with widely varying pH-values. Indeed, an unhardened gelatin layer softens even at 30° C., thereby losing its firmness, whereas emulsion layers containing gelatin have to be resistant to treatments at relatively high temperatures in successive baths which widely vary in pH.

Certain proteinaceous starting material such as, e.g., gelatin, casein, zein, collagen, may be hardened by treating them with metal salts or with organic compounds which confer a lower solubility, a lower water-absorption and a higher heat resistance to the finished material.

Examples of such metal salts are chromium, aluminum and zirconium salts.

As organic products proposed in this connection may be cited, e.g., aldehydes, e.g., formaldehyde, acetaldehyde, acrolein, glyoxal and derivatives, mixtures of an aliphatic aldehyde and an aromatic compound, the nucleus of which bears at least one hydroxyl group such as phenol, resorcinol and resorcylaldehyde; compounds having two or more reactive groups which thus can cross-link the polypeptide chain, e.g., diketones, polyanhydrides, polyepoxides and compounds having at least two ethylene-imino groups (see Belgian patent specification 575,440); reaction products of macromolecular compounds having amino- and/or hydroxyl groups with some classes of unsaturated aliphatic compounds having carboxyl groups (see Belgium patent specifications 552,537, 565,859 and 565,862); high molecular polysaccharides having secondary alcohol groups oxidized to aldehyde groups (as described in our Belgian patent specification 566,352); and some classes of sulfofluorides (see Belgian patent specifications 571,228 and 571, 229).

We have now found that good hardening of proteins and proteinaceous materials is attainable with other hardening agents in the form of polymeric compounds containing halogen atoms attached to carbon atoms, these carbon atoms being situated in α-position in respect to an activating group.

Accordingly the present invention resides in a method of hardening a protein or proteinaceous material in which the said protein or proteinaceous material is caused to react with at least one polymeric compound consisting of or including units each of which comprises a halogen atom attached to a carbon atom situated in α-position in respect to an activating group.

The polymeric compounds used as hardening agents can be divided into two classes. In the first one the carbon atoms, which are substituted by both a halogen atom and an activating group belong to the main polymeric chain. In the second one of these carbon atoms belong to side chains attached to the main polymeric chain. In the case of copolymers, carbon atoms in both the main and side chains may be substituted as aforesaid.

An example of polymeric compounds pertaining to the first class are the homopolymers and copolymers of α-bromo-acrylic acid, comprising units of the formula:

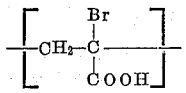

Examples of the second class of polymeric compounds are those which contain structural units which may be represented by the general formula:

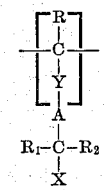

wherein:
X represents a halogen atom such as a chlorine atom or a bromine atom;
A is an activating group selected from the following bifunctional radicals —NH.CO—, —O.OC—, —CO.O—, CO.O.CH$_2$— and —CH—;
                                                                           OH
Y represents a single bond or the bifunctional —CO.O. CH$_2$— radical, and
R, R$_1$ and R$_2$ (the same or different) each represents a hydrogen atom or a methyl group.

As examples of polymeric compounds can be mentioned -poly-(α-bromoacrylic acid)

-copoly(vinylbromoacetate/maleic anhydride)

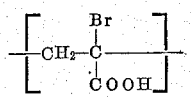

-copoly(acrylic acid/γ-chloro-β-hydroxypropyl acrylate)

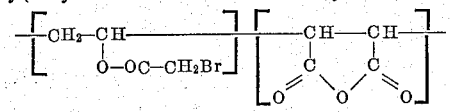

-copoly(acrylic acid/chloromethylacrylate)

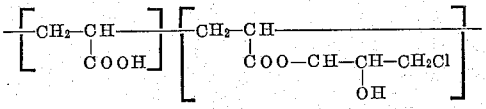

-copoly(acrylic acid/α-chloroethylacrylate)

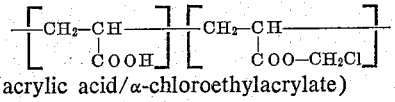

-copoly(acrylic acid/β-chloroethylacrylate)

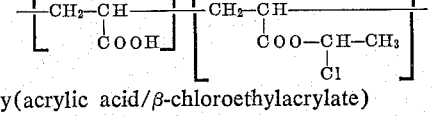

-copoly(acrylic acid/β-bromoethylacrylate)

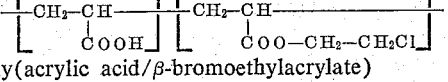

-copoly[ethylene/N - (chloroacetyl)aminomethyl maleate]

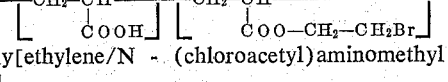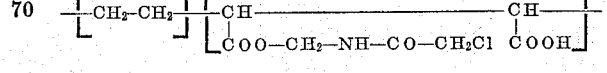

In carrying out the present invention a mixture of two or more hardening agents as above defined may be used.

In general the organic hardening substances used according to the invention act comparatively quickly so that a long storage time is unnecessary for attaining a sufficiently stabilized state of hardening. Nor is it necessary to heat the materials strongly in order to reach a high degree of hardening. This is of importance in the case, e.g., of photographic silver halide emulsion layers where strong heating may easily lead to reduction in sensitivity and fog formation.

For carrying out the method according to the present invention a polymeric compound containing activated halogen atoms may be added to a solution of the protein, more particularly to a gelatin solution, or to a photographic gelatin emulsion before this is formed into a layer. When the molecular weight of the selected polymeric compound is not too high it can be absorbed by immersing the proteinaceous mass in a solution of the polymeric compound containing activated halogen atoms.

After forming on a support, e.g., a paper or other backing sheet a layer from a solution as aforesaid containing a polymeric compound bearing activated halogen atoms, and after drying, the coated sheet is stored for some time to allow the hardening reaction to take place. In many cases a storage time of 2–5 days is sufficient.

The pH of the mixture before coating or during storage also influences the hardening reaction. Although the hardening can occur at a low pH, it is advantageous in the case of gelatin to use a neutral or slightly alkaline mixture resulting in a rapid and intense hardening.

The amount of polymeric hardening agent used may be varied within wide limits according to circumstances in individual cases (material to be hardened, degree of hardening required, drying method, pH, etc.).

To obtain the desired effect in the hardening of photographic gelatin layers, an amount of hardening agent of 1 to 10% of the weight of the dry gelatin will generally suffice.

The probability of cross-linking of two adjacent protein chains is very high when using a macromolecular hardener according to the invention. Indeed, to cross-link two protein molecules, the reaction of these two protein molecules with only two of the many activating or reactive groups of one macromolecular chain of the polymeric hardener is needed.

Due to their macromolecular structure and if their molecular weight is high enough the polymeric compounds used according to this invention do not diffuse into an adjacent layer when they are incorporated into a proteinaceous layer of a multi-layer material, e.g., in a protein layer of a photographic material comprising two or more adjacent protein or more especially gelatin layers. Thus these hardening agents may advantageously be used in a gelatin or other protein layer of a multi-layer material where such diffusion is undesirable. An example of such a use is the image-receiving layer of a two-layer material used for manufacturing reversal images by the silver halide diffusion transfer process and which contains development or reduction nuclei or substances for producing such nuclei as described in U.K. specification No. 654,631 the image-receiving layer being coated with a gelatin silver halide emulsion layer.

Gelatin layers when hardened according to the invention possess a considerably higher resistance to mechanical damage, and a higher softening- or melting point in aqueous solutions. This is of the greatest importance for photographic emulsion layers and other gelatin containing auxiliary layers such as, e.g., protective layers, anti-halation layers, backing layers, filter layers, etc., since the improvement of the physical properties permits a safe treatment of the photographic material in the different processing baths.

The following examples illustrate the present invention without limiting, however, the scope thereof.

EXAMPLE 1

A.—*Preparation of copoly(acrylic acid/γ-chloro-β-hydroxy propylacrylate)*

2.5 g. of acrylic acid and 9.1 g. of γ-chloro-β-hydroxypropylacrylate (prepared from acrylic acid and epichlorhydrine, using ferrichloride as a catalyst) dissolved in 45 ml. of dioxane are brought in a pressure tube. Then 100 mg. of azo-bis-isobutyronitrile are added thereto, whereafter the tube is sealed. The whole is heated at 75° C. for 21 hours. A solution of copoly (acrylic acid/γ-chloro-β-hydroxypropylacrylate) is formed which is diluted with 45 ml. of water and the pH of the solution is adjusted at 7 with an aqueous sodium hydroxide solution. The resulting aqueous solution is used as such in the following hardening step.

B.—*Hardening with copoly(acrylic acid/γ-chloro-β-hydroxy-propylacrylate)*

To 100 cm.$^3$ of a 5% aqueous gelatin solution of pH 6.5 are added 5 ml. of a 5% solution of copoly(acrylic acid/γ - chloro-β-hydroxypropylacrylate) as prepared above in a mixture of dioxane and water (50:50). The solution obtained is coated onto glass-plates, solidified and dried. After a storage of 36 hours at 50° C., the gelatin layers obtained resist a treatment of 10 minutes in boiling water without losing their firmness. A gelatin layer to which no copolymer was added already dissolves in water at 30° C.

EXAMPLE 2

A.—*Preparation of copoly(acrylic acid/chloromethylacrylate)*

13.1 g. of chloromethylacrylate (prepared according to A. Ia. Iakubovich et al., Journal of General Chemistry U.S.S.R., 28, 1971 (1958) and 3.9 g. of acrylic acid in 40 ml. of dioxane are heated for 2 hours in a sealed tube at 75° C. in the presence of 125 mg. of azo-bis-isobutyronitrile. The copolymer formed precipitates when the solution is poured into ether and after washing the precipitate is dried.

B.—*Hardening with copoly(acrylic acid/chloromethylacrylate)*

To 1 kg. of a solution intended to be coated as a backing layer on a photographic film and which contains 80 g. of gelatin, are added 100 ml. of a 5% aqueous solution of copoly(acrylic acid/chloromethylacrylate) as prepared above. The mixture is coated onto a subbed photographic film, solidified and dried. Already after a few days storage at room temperature the layer shows a high degree of hardening. It swells only little when treated in an aqueous medium and resists a treatment in water at 80° C. without losing strength.

EXAMPLE 3

A.—*Preparation of copoly[ethylene/N-(chloroacetyl) aminomethyl maleate]*

4 g. of Resin DX840–21 (commercially available copoly (ethylene/maleic anhydride (50:50) of Monsanto Chemical Company, St. Louis, Mo., U.S.A.) in 40 ml. of anhydrous acetone are refluxed for 2 hours in the presence of 8 g. of N-methylol-chloro-acetamide and a drop of sulfuric acid as a catalyst. After reaction the clear solution is poured in ether. The sticky precipitate formed is purified by precipitating its solution from tetrahydrofurane into ether.

B.—*Hardening by copoly[ethylene/N-(chloroacetyl)-aminomethyl maleate]*

To 100 ml. of a 5% aqueous gelatin solution of pH 7 are added 10 ml. of a 5% aqueous solution of copoly[ethylene/N-(chloroacetyl)-aminomethyl maleate] as prepared above.

The gelatin solution is coated onto glass-plates, solidified and dried.

After a few days storage at room temperature, the gelatin layers show a strongly decreased swelling when treated in an aqueous medium. They resist treatments in water of 80° C. without losing their strength.

A gelatin layer to which no copolymer was added, already easily dissolves in water of 30° C.

EXAMPLE 4

A.—Preparation of copoly(vinylbromoacetate/maleic anhydride)

20.6 g. of vinylbromoacetate and 12.2 g. of maleic anhydride are copolymerized by heating at 75° C. in a mixture of 90 ml. of anhydrous acetone and 40 ml. of carbon tetrachloride in the presence of 500 mg. of azo-bis-isobutyronitrile as a catalyst. After polymerization the low viscous solution is precipitated into hexane and the formed precipitate is washed and dried under reduced pressure. Intrinsic viscosity in acetone at 20° C.:0.05.

B.—Hardening by copoly(vinylbromoacetate/maleic anhydride)

To 1 kg. of a contrasty photographic gelatin silver halide emulsion containing 80 g. of gelatin, are added 80 ml. of a 5% aqueous solution of copoly(vinylbromoacetate/maleic anhydride) as prepared above. The emulsion is coated onto film, solidified and dried.

Already after a few days storage at room temperature the emulsion layer is strongly hardened. When treated in an aqueous medium it swells very little and resists to temperatures up to 80° C. Moreover the emulsion layer shows only little "after-hardening," in other words after a few weeks the degree of hardening remains practically unchanged.

EXAMPLE 5

A.—Preparation of poly (α-bromoacrylic acid)

3.6 g. of polyacrylic acid (specific viscosity of a 1% solution in methanol: 0.9) are dissolved in 100 ml. of anhydrous dioxane. The reaction mixture is heated with a I.R. lamp until reflux temperature and 8 g. of bromine is then dropwise added whilst stirring. After adding the bromine stirring is continued with refluxing for 3 hours whilst irradiating with an U.V. lamp. The reaction mixture containing the dissolved formed polymer is kept overnight at room temperature. This polymeric solution is poured into anhydrous ether and the precipitate formed is redissolved in dioxane and reprecipitated in ether. The polymer is sucked off, washed with ether and dried under reduced pressure.

B.—Hardening by poly(α-bromoacrylic acid)

To 100 ml. of a 5% aqueous gelating solution of pH 7 are added 5 ml. of a 5% aqueous solution of poly(α-bromoacrylic acid) as prepared above. The gelatin solution is coated on glass-plates, solidified and dried.

Already after 3 days storage at 55° C. the gelatin layers resist a treatment in boiling water without losing their firmness.

A gelatin layer to which no polymer was added readily dissolves in water of 30° C.

We claim:

1. A reaction product of a gelatin and about 3–12% by weight of said gelatin of a high molecular weight, water-soluble linear polymeric compound having a carbon-to-carbon main chain and being selected from the group consisting of homopolymers and addition copolymers of an ethylenicaly unsaturated monomer bearing a side group containing an activating radical selected from the group consisting of a —NHCO— group, a —OOC— group, a —COO— group, a —COOCH₂— group, and a —CHOH— group, and a halogen atom attached to a carbon atom in a position alpha with respect to said activating radical.

2. Reaction product of claim 1 wherein said polymeric compound is copoly(acrylic acid/γ-chloro-β-hydroxypropyl acrylate).

3. Reaction product of claim 1 wherein said polymeric compound is copoly(acrylic acid/chloromethyl acrylate).

4. Reaction product of claim 1 wherein said polymeric compound is copoly(ethylene/N-(chloroacetyl)-aminoethyl maleate).

5. Reaction product of gelatin and copoly(vinyl bromoacetate/maleic anhydride).

6. Reaction product of claim 1 wherein said polymeric compound is poly(α-bromoacrylic acid).

7. A method of hardening a protein comprising reacting said protein with about 3–12% by weight of said protein of a high molecular weight, water-soluble, linear polymeric compound having a carbon-to-carbon main chain and being selected from the group consisting of homopolymers and addition copolymers of an ethlenically unsaturated monomer bearing a side group containing an activating radical selected from the group consisting of a —NHCO— group, a —OOC— group, a —COO— group, a —COOCH₂— group, and a —CHOH— group, and a halogen atom attached to a carbon atom in a position alpha with respect to said activating radical.

8. A method as in claim 7 wherein said polymer has said activating radical and said halogen atom attached to a single carbon atom forming a part of the main polymer chain.

9. A method as in claim 7 wherein said side group is selected from the group consisting of

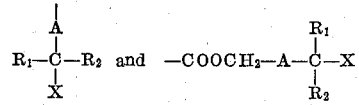

wherein A is an activating group selected from the group consisting of a —NHCO— group, an —OOC— group, a —COO— group, a —COOCH₂— group, and a —CHOH— group; and X is a halogen atom and $R_1$ and $R_2$ are each selected from the group consisting of a halogen atom and a methyl group.

10. A photographic film comprising a backing layer constituted by the reaction product of claim 1.

11. A photographic light-sensitive material comprising a silver halide emulsion layer containing as binding agent the reaction product of claim 1.

References Cited by the Examiner

UNITED STATES PATENTS

| | | | |
|---|---|---|---|
| 2,476,527 | 7/1949 | Barnes et al. | 96—114 |
| 2,732,303 | 1/1956 | Morgan et al. | 96—111 |
| 2,852,382 | 9/1958 | Illingsworth et al. | 96—114 |

FOREIGN PATENTS

| | | |
|---|---|---|
| 860,631 | 2/1961 | Great Britain. |

NORMAN G. TORCHIN, *Primary Examiner.*

J. T. BROWN, *Assistant Examiner.*